United States Patent [19]

Lienert et al.

[11] Patent Number: 6,074,757

[45] Date of Patent: Jun. 13, 2000

[54] MIXTURES OF SOLUTIONS OF POLYAMIDOCARBOXYLIC ACIDS AND SOLUTIONS OF POLYIMIDE-FORMING STARTING MATERIALS

[75] Inventors: Klaus-Wilhelm Lienert; Gerold Schmidt, both of Hamburg; Rainer Blum, Ludwigshafen, all of Germany

[73] Assignee: Schenectady Europe GmbH, Hamberg, Germany

[21] Appl. No.: 09/024,081

[22] Filed: Feb. 17, 1998

[30] Foreign Application Priority Data

Feb. 15, 1997 [DE] Germany ............................ 197 05 882

[51] Int. Cl.$^7$ ...................................... B32B 27/00
[52] U.S. Cl. ..................... 428/473.5; 528/288; 528/296; 528/308; 528/335; 528/350; 528/353; 528/928; 525/437; 525/540; 427/207.1; 427/340; 427/372.2; 427/385.5
[58] Field of Search ..................... 528/335, 350, 528/353, 928, 288, 296, 308; 525/437, 540; 427/207.1, 340, 372.2, 385.5; 428/473.5

[56] References Cited

U.S. PATENT DOCUMENTS 3,207,728  9/1965  Blomstrom .
3,234,181  2/1966  Olivier .

FOREIGN PATENT DOCUMENTS

| 0 170 591 | 7/1985 | European Pat. Off. . |
| 0 209 670 A2 | 5/1986 | European Pat. Off. . |
| 0 336 374 | 4/1989 | European Pat. Off. . |
| 41 35 056 A1 | 10/1991 | Germany . |
| 41 35 058 A1 | 10/1991 | Germany . |
| 898651 | 9/1959 | United Kingdom . |

*Primary Examiner*—Sam A. Acquah

[57] ABSTRACT

The invention relates to mixtures of preferably from 80 to 99.9% by weight, based on the mixture, of a solution S1 comprising one or more polyamidocarboxylic acids and preferably from 0.1 to 20% by weight, based on the mixture, of a solution S2 comprising one or more, preferably primary, diamines and one or more tetracarboxylic acid diesters, processes for producing polyimide coatings using such mixtures, the use of such mixtures for producing polyimide coatings, and also polyamide-coated articles obtainable using such mixtures.

8 Claims, No Drawings

MIXTURES OF SOLUTIONS OF POLYAMIDOCARBOXYLIC ACIDS AND SOLUTIONS OF POLYIMIDE-FORMING STARTING MATERIALS

FIELD OF THE INVENTION

The present invention relates to mixtures of solutions S1 of polyamidocarboxylic acids and solutions S2 of diamines and tetracarboxylic acid diesters as polyimide-forming starting materials, the use of such mixtures for producing coatings and also polyimide-coated articles obtainable using such mixtures.

BACKGROUND OF THE INVENTION

Polyimides are polymers which form films having excellent chemical, physical and electrical properties. The polyimides which are usually available today are generally solutions of the polyimide precursors in suitable solvents. After application of the coatings, the coatings are dried and cured, forming the insoluble imide structures. Various polyimide precursors are known for this purpose. Customarily, suitable primary diamines are reacted with tetracarboxylic acid dianhydrides to give polyamidocarboxylic acids, as described, for example, in GB-B 898 651, U.S. Pat. No. 3,207,728 or U.S. Pat. No. 3,234,181. Such polyamidocarboxylic acids are soluble in suitable solvents, eg. N-methylpyrrolidone. After application of the coatings, the coatings are dried and cured, forming the insoluble imide structures by elimination of water. The polyimides produced in this way have, if they have been prepared, for example, from bis(4-aminophenyl) oxide and pyromellitic dianhydride, glass transition temperatures of above 400° C. and decomposition temperatures of about 580° C. The polyamidocarboxylic acids are soluble in certain solvents, eg. N-methylpyrrolidone, but have, owing to their molecular structure, a high viscosity and a comparatively low solids content. They are not stable on storage at room temperature and have to be stored at low temperatures, eg. from 0 to 5° C. For some applications, eg. planarization in chip production, their low solids content is not optimal.

A higher solids content can be obtained by means of formulations in which dialkyl polyamidocarboxylates are used. These formulations are described, for example, in EP-A-0 209 670 and have improved stability on storage and planarization, but they are expensive to produce.

Solutions prepared from diamines and tetracarboxylic acid diesters, as described, for example, in DE-A-41 35 056 and DE 41 35 058, represent polyimide precursors which are more favorable in terms of the solids-viscosity ratio. The solutions are stable on storage at room temperature. Appropriate application and curing of the solutions gives polyimide films. At solids contents of 50% by weight and above, these solutions have viscosities which correspond to those of the commercial polyamidocarboxylic acid solutions. During curing, the esterifying alcohols and water are eliminated. Depending on the starting materials used, polyimides having glass transition temperatures around 300° C. and decomposition temperatures around 520° C. are obtained after curing. The poorer thermal properties result from the imperfect polyimide structures formed as a result of curing.

SUMMARY OF THE INVENTION

The object of the present invention is thus to prepare storage-stable solutions of polyimide precursors which have a more favorable solids-viscosity ratio than the solutions of polyamidocarboxylic acids. In addition, the polyimides produced therefrom should have better thermal properties than the polyimides which are produced from the pure solutions of diamines and tetracarboxylic acid diesters.

It has surprisingly been found that mixtures of solutions S1 comprising one or more polyamidocarboxylic acids with solutions S2 comprising one or more diamines and one or more tetracarboxylic acid diesters give coating compositions whose viscosity is lower than the viscosity of the respective starting solutions S1 and S2. In these mixtures, the viscosity drops to a minimum over a certain period of time and then remains constant. It is thus possible to produce solutions of polyamidocarboxylic acids which have a higher solids content than the customary products of the prior art which are equally readily processable.

In a preferred embodiment of the invention, the mixture is composed of from 0.1 to 20% by weight, particularly preferably from 1 to 10% by weight, of the solution S2 comprising diamine and tetracarboxylic acid diester and of from 80 to 99.9% by weight, particularly preferably from 90 to 99% by weight, of the solution S1 comprising polyamidocarboxylic acid.

In further, preferred embodiments of the invention, the polyamidocarboxylic acids in the solution S1 are prepared from primary diamines and tetracarboxylic acid anhydrides, at least 2 mol %, based on all ester groups, of the ester groups of the tetracarboxylic acid diesters in the solution S2 can be derived from alcohols of the general formula

$$HO-Z-O-X \qquad (I)$$

or

$$HO-Z-X \qquad (II),$$

where Z is a linear or branched aliphatic radical having from 1 to 15, preferably from 1 to 8, carbon atoms which may be interrupted by from 1 to 4, preferably 1 or 2, ether groups —O— and X is an aromatic radical having from 5 to 20 carbon atoms which may also contain N, O or S as heteroatoms in the aromatic ring system, and the tetracarboxylic acid diesters are a mixture of from 0.05 to 0.95 mol % of oxydiphthalic diesters and from 0.05 to 0.95 mol % of benzophenonetetracarboxylic diesters and/or biphenyltetracarboxylic diesters.

DETAILED DESCRIPTION OF THE PREFERRED EMBODIMENT

The solutions S2 comprise tetracarboxylic acid diesters and diamines as starting materials for polyimides.

Suitable tetracarboxylic acid diesters are, in particular, those which are derived from aromatic or partially aromatic tetracarboxylic acid anhydrides having at least one aromatic ring. These can be tetracarboxylic acid diesters having one aromatic ring, having fused aromatic ring systems or having aromatic rings which are joined, for example, by a single bond, an ether, sulfonyl or carbonyl group or aliphatic hydrocarbon radicals, in particular ones having from 1 to 8 carbon atoms and, if desired, containing heteroatoms such as oxygen, sulfur or nitrogen. The aromatic rings or ring systems may bear, in particular, $C_1$–$C_6$-alkyl or $C_1$–$C_6$-alkoxy groups or halogen atoms as substituents. As examples of the tetracarboxylic acid anhydrides, mention may be made of the tetracarboxylic acid anhydrides mentioned in the description of DE-A-41 35 056, with preference being given to using mixtures of tetracarboxylic acid diesters which are derived from oxydiphthalic dianhydrides, benzophenonetetracarboxylic dianhydrides and biphenyltetracarboxylic dianhydrides. Particular preference is given to using, as tetracarboxylic acid diesters, mixtures of from 0.05 to 0.95 mol %, preferably from 0.2 to 0.8 mol %, of oxydiphthalic diesters and from 0.05 to 0.95 mol %, preferably from 0.2 to 0.8 mol %, of benzophenonetetracarboxylic diesters and/or biphenyltetracarboxylic diesters, where the mol % are based on the total amount of tetracarboxylic acid diesters.

The ester groups in the tetracarboxylic acid diesters are derived, for example, from $C_1$–$C_8$-alcohols, but preferably at least 2 mol %, based on all ester groups, are derived from alcohols of the general formula

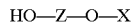 (I)

or

 (II), where Z is a linear or branched aliphatic radical having from 1 to 15, preferably from 1 to 8, carbon atoms which may be interrupted by from 1 to 4, preferably 1 or 2, ether groups —O— and X is an aromatic radical having from 5 to 20 carbon atoms which may also contain N, O or S as heteroatoms in the aromatic ring system. Very particularly preferably X is a phenyl ring and Z is a $C_1$–$C_6$-alkyl radical.

Preferred alcohols of the formula I are ethylene glycol monophenyl ether or propylene glycol monophenyl ether.

Preferred alcohols of the formula II are benzyl alcohol, 1-hydroxy-2-phenylethane and 1-hydroxy-3-phenylpropane.

Furthermore, polyfunctional alcohols can also be used in subordinate amounts.

Preferably, at least 10 mol %, particularly preferably at least 30 mol %, of the ester groups in the diesters are derived from the alcohols of the formulae I or II. Very particularly preferably, all ester groups in the diesters are derived from alcohols of the formulae I or II. The preparation of the tetracarboxylic acid diesters is described, for example, in DE-A-41 35 058.

Suitable diamines are, in particular, aromatic or partially aromatic diamines which contain at least one aromatic ring. The diamines preferably have primary amino groups. These diamines can have one aromatic ring, have fused aromatic ring systems or aromatic rings which are joined, for example, by a single bond, an ether, carbonyl or sulfonyl group or aliphatic hydrocarbon radicals, in particular ones having from 1 to 8 carbon atoms and, if desired, also heteroatoms such as sulfur, nitrogen or oxygen. The aromatic rings or ring systems may bear, in particular, $C_1$–$C_6$-alkyl or $C_1$–$C_6$-alkoxy groups or halogen atoms as substituents. Examples which may be mentioned are the diamines mentioned in DE-A-41 35 058, with preference being given to using bis(aminophenyl)methane, bis(aminophenyl) oxide, bis(aminophenyl) sulfide, bis(aminophenyl) sulfone or 2,2-bis(4-(4-aminophenoxy)phenyl)propane or mixtures thereof.

Suitable solvents for preparing the solutions S2 comprising the tetracarboxylic acid diesters and the diamines are, for example, polar organic solvents such as aliphatic or aromatic alcohols, ethers, ketones, aldehydes or esters. Furthermore, up to 10% by weight, based on the mixture of S1 and S2, of nonpolar solvents as diluents, eg. xylene or Solventnaphtha®, can be present in the solutions S2.

Preference is given to using highly polar solvents such as N-methylpyrrolidone, formamide, dimethylformamide, alkylalkylenediureas such as dimethylethylenediurea or dimethylpropylenediurea, dimethyl sulfoxide, butyrolactone, pyrrolidone, dialkylacetamide but also glycols, glycol esters and glycol ethers.

Another useful solvent is obviously the alcohol usually used in excess in the preparation of the tetracarboxylic acid diesters.

The choice of solvent depends essentially on the solubility or the polarity of the tetracarboxylic acid diesters and the diamines.

The tetracarboxylic acid diesters and the diamines are preferably present in the solutions S2 in a molar ratio of from 1.5:1 to 1:1.5, particularly preferably in a molar ratio of 1:1.

The solids content of the solutions S2 is preferably between 30 and 60% by weight.

To prepare the solutions S2, tetracarboxylic acid diester, diamine and solvent can be combined in any order. For example, it is possible to first prepare the tetracarboxylic acid diester by reacting a tetracarboxylic acid anhydride with an excess of alcohol and then to add the diamine and, if desired, a further solvent to the resulting mixture. In order to bring all components into solution, the mixture is, if required, stirred at room temperature or elevated temperature, eg. between 30 and 120° C.

The solutions S2 can further comprise customary additives such as catalysts for imide formation, dyes, pigments, fillers, leveling agents and viscosity-regulating substances.

The solutions S1 comprise polyamidocarboxylic acids as are described, for example, in GB-B 898,651, U.S. Pat. No. 3,207,728 or U.S. Pat. No. 3,234,181.323

The polyamidocarboxylic acids are preferably formed from diamines and tetracarboxylic acid dianhydrides. Preferred diamines are the abovementioned aromatic or partially aromatic diamines which contain at least one aromatic ring. Preferred tetracarboxylic acid anhydrides are pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 2,2-bis(3,4-dicarboxyphenyl)propane dianhydride, 3,4,9,10-perylenetetracarboxylic dianhydride, bis-(3,4-dicarboxyphenyl) ether dianhydride or ethylenetetracarboxylic dianhydride. Also preferred are the tetracarboxylic acid dianhydrides mentioned in DE-A-41 35 056.

The preparation of the polyamidocarboxylic acid is preferably carried out in solvents which are inert toward the diamines and the tetracarboxylic acid dianhydrides and which are a solvent for the resulting polyamidocarboxylic acid and thus form the solutions S1 with the latter.

The solutions S1 can likewise further comprise the customary additives such as catalysts for imide formation, dyes, pigments, fillers, leveling agents and viscosity-regulating substances.

For the solutions S1 and S2, particular preference is given to using the same solvents as have been described above.

The mixtures of the present invention are produced by mixing the solutions S1 and S2. Preferably, the solution S1 is placed in a mixing vessel and the amount of solution S2 necessary to give the desired mixing ratio is added either all at once or in portions, with stirring and, if desired, heating. The mixing ratios S1:S2 can generally be selected freely. In a preferred embodiment of the invention, the mixture is composed of from 0.1 to 20% by weight, particularly preferably from 1 to 10% by weight, of the solution S2 comprising diamine and tetracarboxylic acid diester and of from 80 to 99.9% by weight, particularly preferably from 90 to 99% by weight, of the solution S1 of the polyamidocarboxylic acid.

It should be emphasized that even small additions of the solution S2 to the solution S1 significantly reduce the original viscosity of the solution S1. Mixtures of solutions S1 comprising polyamidocarboxylic acids with solutions S2 comprising diamines and tetracarboxylic acid diesters give coating compositions whose viscosity is lower than the viscosity of the starting solutions S1 and S2. After mixing, the viscosity drops to a minimum over a certain period of time and then remains constant. It is thus possible to produce solutions of polyamidocarboxylic acids which have a higher solids content than the customary products of the prior art which are equally readily processible. In addition, it has been found that mixing the polyamidocarboxylic acid solution S1 with small amounts of the solution S2 leads to coating compositions which are stable on storage at room temperature.

The mixtures of the present invention are suitable as coating compositions for producing polyimide coatings on a wide variety of substrates such as metal, glass or silicon. The curing of the coating is preferably carried out at final temperatures between 150 and 450° C., particularly preferably between 300 and 400° C. It has been found to be particularly advantageous to carry out the curing process in a plurality of stages by increasing the temperature stepwise to the final temperature.

The resulting polyimide coatings have a higher thermal stability in respect of glass transition temperature and decomposition temperature than coatings which have been produced using only solutions S2, as described, for example, in DE-A 41 35 056 and DE-A 41 35 058. The solutions of the present invention can also be used to produce planar coatings which are bubble-free in high layer thicknesses.

The examples below illustrate the invention without restricting it to these examples.

EXAMPLES

Example 1

Preparation of the Polyamidocarboxylic Acid Solution S1

The polyamidocarboxylic acid is prepared by the method described in GB-B 898,651 from 40.00 parts of bis(4-aminophenyl) oxide and 43.00 parts of pyromellitic dianhydride in N-methylpyrrolidone. The 16% strength solution S1 of the polyamidocarboxylic acid in N-methylpyrrolidone has a viscosity of 8200 mPas at 25° C.

Example 2

Preparation of the Solution S2 Comprising the Diamine and the Tetracarboxylic Acid Diester The solution S2 is prepared by the method described in DE 41 35 058 in the following steps:
1.) Reaction of the tetracarboxylic acid anhydride with alcohol at 100° C. for 30 minutes in the presence of dimethylaminopyridine as catalyst and a first partial amount of N-methylpyrrolidone to give the tetracarboxylic acid diester.
2.) After cooling to 60° C., addition of the diamine and further N-methylpyrrolidone solvent and stirring until the solution S2 has been formed.

The amounts used are:
27.92 parts of oxydiphthalic dianhydride
3.23 parts of benzophenonetetracarboxylic dianhydride
1.53 parts of ethylene glycol monophenyl ether
5.44 parts of methanol
0.36 part of water
27.39 parts of N-methylpyrrolidone
0.25 part of dimethylaminopyridine
41.02 parts of 2,2-bis[(4-aminophenoxy)phenyl]propane
30.00 parts of N-methylpyrrolidone The 59% strength solution S2 has a viscosity of 9400 mPas at 25° C.

Example 3

Production of the Mixtures of the Present Invention from the Solutions S1 and S2

The solutions S1 and S2 were mixed with stirring at 23° C. in the ratios shown in Table 1.

| Mixture | Parts by weight of S1 | Parts by weight of S2 | Viscosity in mPas at 25° C. |
| --- | --- | --- | --- |
| M1 | 99 | 1 | 2200 |
| M2 | 95 | 5 | 635 |
| M3 | 90 | 10 | 430 |
| M4 | 80 | 20 | 315 |
|  | 100 | — | 8200 |
|  | — | 100 | 9400 |

We claim:
1. A composition comprising
   a solution (S1) comprising one or more polyamidocarboxylic acids, and
   a solution (S2) comprising one or more diamines and one or more tetracarboxylic acid diesters.
2. The composition of claim 1, comprising
   from 80 to 99.9% by weight of the solution (S1), based on the composition, and
   from 0.1 to 20% by weight of the solution (S2), based on the composition.
3. The composition of claim 1 wherein the tetracarboxylic acid diesters of the solution (S2) comprise at least 2 mol %, based on all ester groups, of ester groups which are derived from alcohols of the general formula

$$HO-Z-O-X \qquad (I)$$

or $$HO-Z-X \qquad (II),$$

where Z is a linear or branched aliphatic radical having from 1 to 15 carbon atoms which may be interrupted by from 1 to 4 ether groups —O— and X is an aromatic radical having from 5 to 20 carbon atoms which may also contain N, O or S as heteroatoms in the aromatic ring system.
4. The composition of claim 1 wherein the tetracarboxylic acid diesters of the solution (S2) comprise a mixture of
   from 0.05 to 0.95 mol % of oxydiphthalic diesters and
   from 0.05 to 0.95 mol % of one or more diesters selected from the group consisting of benzophenonetetracarboxylic diesters, biphenyltetracarboxylic diesters, and mixtures thereof.
5. A process for producing polyimide coatings on substrates comprising
   applying the composition of claim 1 to a substrate to form a coated substrate and
   curing the coated substrate at a temperature of from 150 to 450° C.

6. The process of claim 5, further comprising carrying out the curing process in a plurality of stages by increasing the temperature stepwise to the final temperature.

7. An article coated with a polyimide, comprising the result of coating a portion of an article with a composition comprising
- a solution (S1) comprising
  - one or more polyamidocarboxylic acids, and
- a solution (S2) comprising
  - one or more diamines, and
  - one or more tetracarboxylic acid diesters, and curing the composition coated on the article to provide a polyimide coated article.

8. A process of producing a polyimide coating, comprising providing a coating composition comprising
- a solution (S1) comprising
  - one or more polyamidocarboxylic acids, and
- a solution (S2) comprising
  - one or more diamines, and
  - one or more tetracarboxylic acid diesters, and curing the coating composition at a temperature sufficient to produce a polyimide coating.

* * * * *